United States Patent [19]

Taylor

[11] 4,148,070
[45] Apr. 3, 1979

[54] VIDEO PROCESSING SYSTEM
[75] Inventor: Richard J. Taylor, London, England
[73] Assignee: Micro Consultants Limited, Berkshire, England
[21] Appl. No.: 764,317
[22] Filed: Jan. 31, 1977
[30] Foreign Application Priority Data
Jan. 30, 1976 [GB] United Kingdom ............... 3731/76
[51] Int. Cl.² ............................................. H04N 5/14
[52] U.S. Cl. .................................. 358/160; 358/140; 358/141; 358/903
[58] Field of Search ............... 358/160, 140, 903, 905, 358/187, 105, 8, 141
[56] References Cited
U.S. PATENT DOCUMENTS

| | | | |
|---|---|---|---|
| 3,810,174 | 5/1974 | Heard | 358/140 |
| 3,904,817 | 9/1975 | Hoffman | 358/140 |
| 3,988,533 | 10/1976 | Mick | 358/105 |
| 3,996,419 | 12/1976 | Kennedy | 358/187 |
| 4,002,827 | 1/1977 | Nevin | 358/140 |
| 4,057,836 | 11/1977 | Munsey | 358/140 |

*Primary Examiner*—Howard W. Britton
*Attorney, Agent, or Firm*—William Anthony Drucker

[57] ABSTRACT

A video processing system comprises an analogue to digital converter for receiving a video signal and converting the signal into digital form. A digital frame store receives and stores the converted video data. Store addressing means address locations within the frame store to write in and read out data therefrom. A digital to analogue converter receives the data read out from the frame store and converts the data into analogue form and accessing means provides random access to the frame store locations during the video blanking time to allow processing of the data with an algorithm.

11 Claims, 6 Drawing Figures

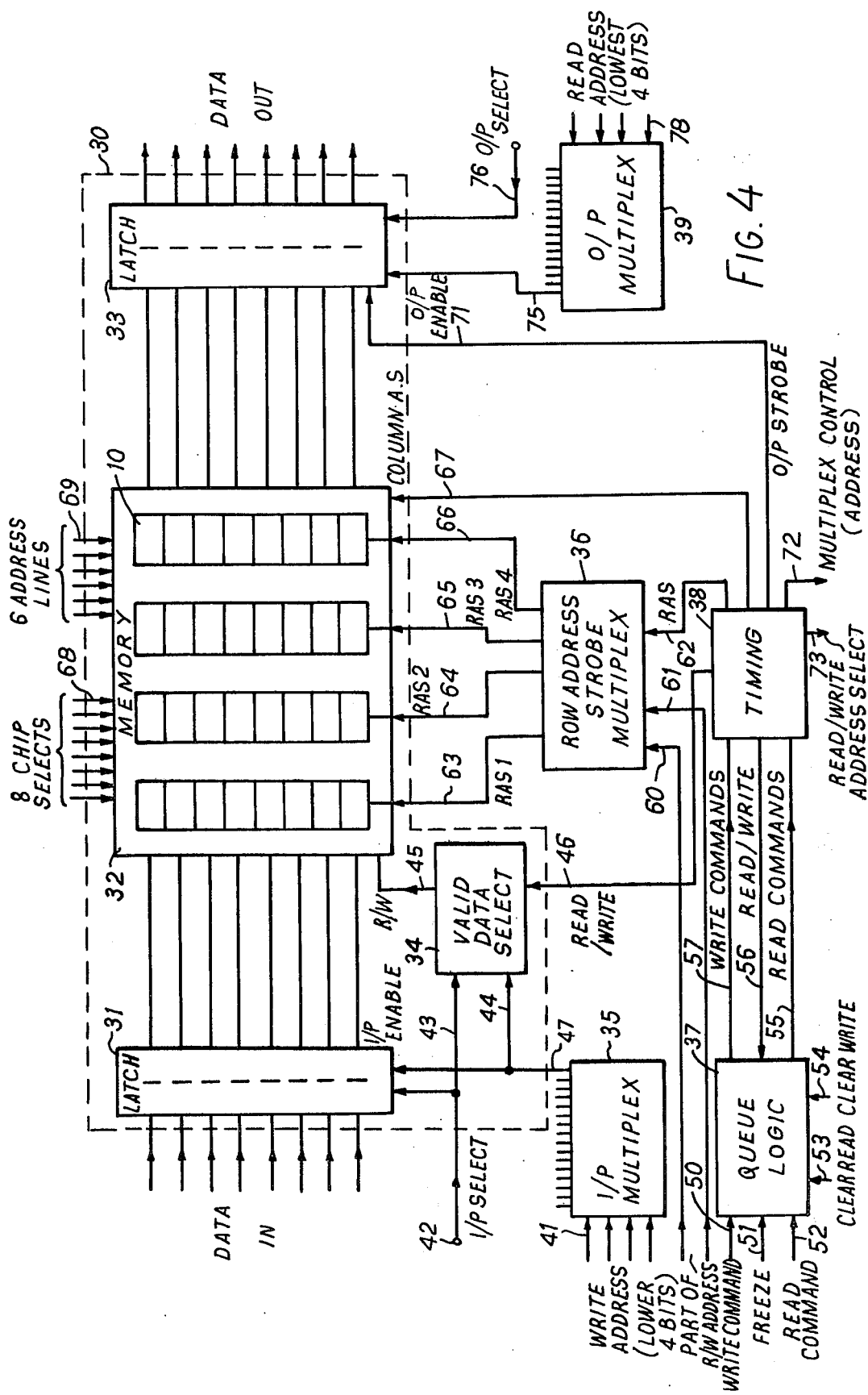

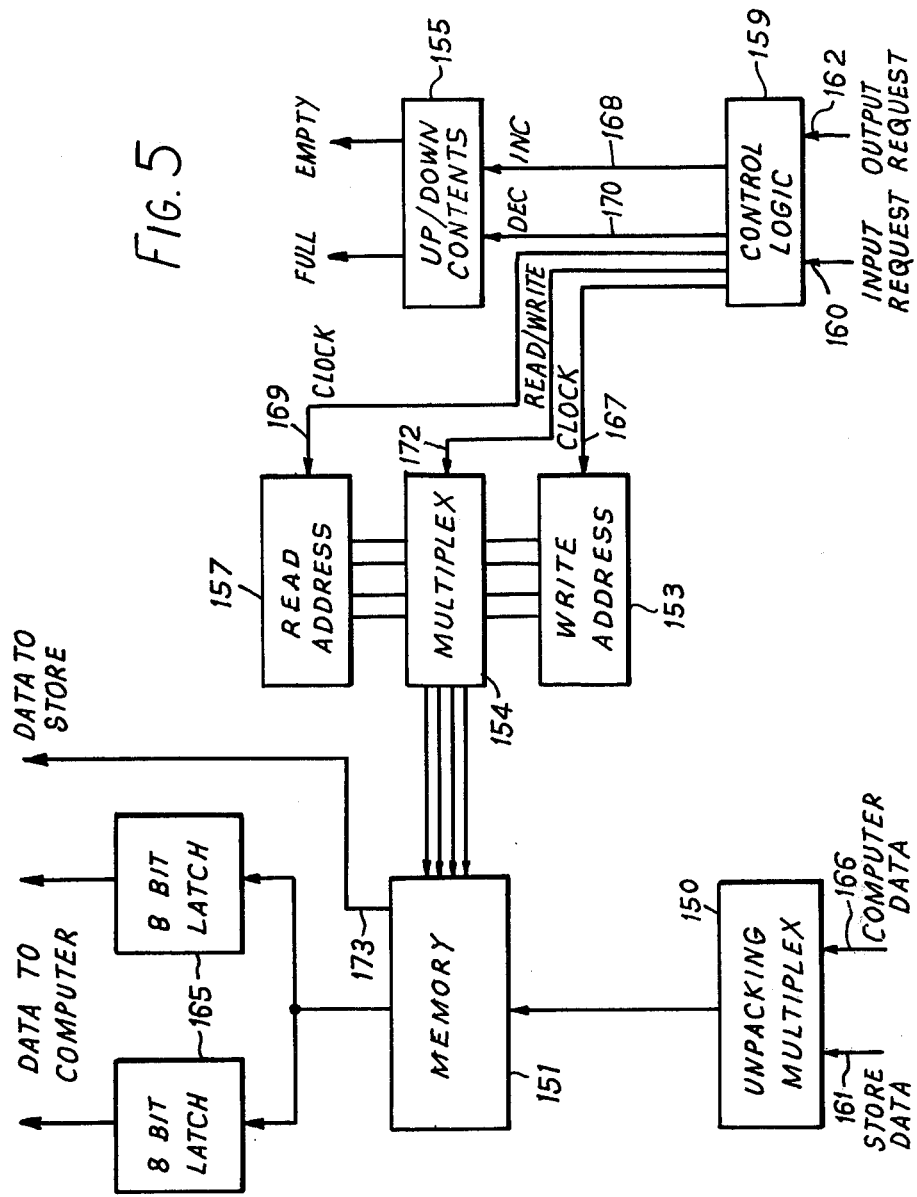

VIDEO PROCESSING SYSTEM

BACKGROUND TO THE INVENTION

The invention relates to the manipulation of pictures by digital methods in diverse fields ranging from broadcast television, infra-red imaging and military image processing, to medical electronics, sonogram displays and pattern generation equipment for commercial artists.

Although it has long been acknowledged that digital techniques have much to offer, particularly where flexibility is important, the implementation and optimization of the appropriate function on anything, but a theoretical basis is often a tedious and cumbersome task.

Even small changes in special purpose hardware are difficult and expensive to undertake and, whilst the digital computer has been available to make light work of the computation aspects, the peripheral equipment necessary for entering images as data into the computer and for displaying the computed results has not been so readily available. Those pieces of equipment that have been built tend to be slow or inflexible and frequently limit the quality of picture.

OBJECT OF THE INVENTION

An object of the invention is to provide an interactive, intelligent, system that has the ability to acquire and process large quantities of data quickly as well as display the results in real-time as the computation proceeds. Furthermore, the acquisition and display media must perform their function without degrading the quality of the original image.

SUMMARY OF THE INVENTION

According to the invention there is provided a video processing system comprising:

analogue to digital converter means for receiving a video signal and converting said signal into digital form, a digital frame store for receiving and storing the converted video data, addressing means for addressing locations within the frame store to write in and read out data therefrom, digital to analogue converter means for receiving data read out from said store and for converting the data into analogue form; and accessing means for providing random access to the frame store locations during the video blanking time to allow processing of the data with an algorithm.

The algorithm may be in the form of software contained in a computer or may be specific hardware.

It is possible with the system of the present invention when using the system for image analysis or processing to enter a picture into the store, choose an algorithm, and observe the result in a matter of seconds. When using the system for image synthesis it is possible to observe the picture at full resolution as it is created.

BRIEF DESCRIPTION OF THE DRAWINGS

The invention will now be described by way of example with reference to the accompanying drawings in which:

FIG. 4 shows an arrangement for the store and store control of FIG. 3, and FIG. 5 shows an arrangement for the computer buffer of FIG. 3.

Figure 1:
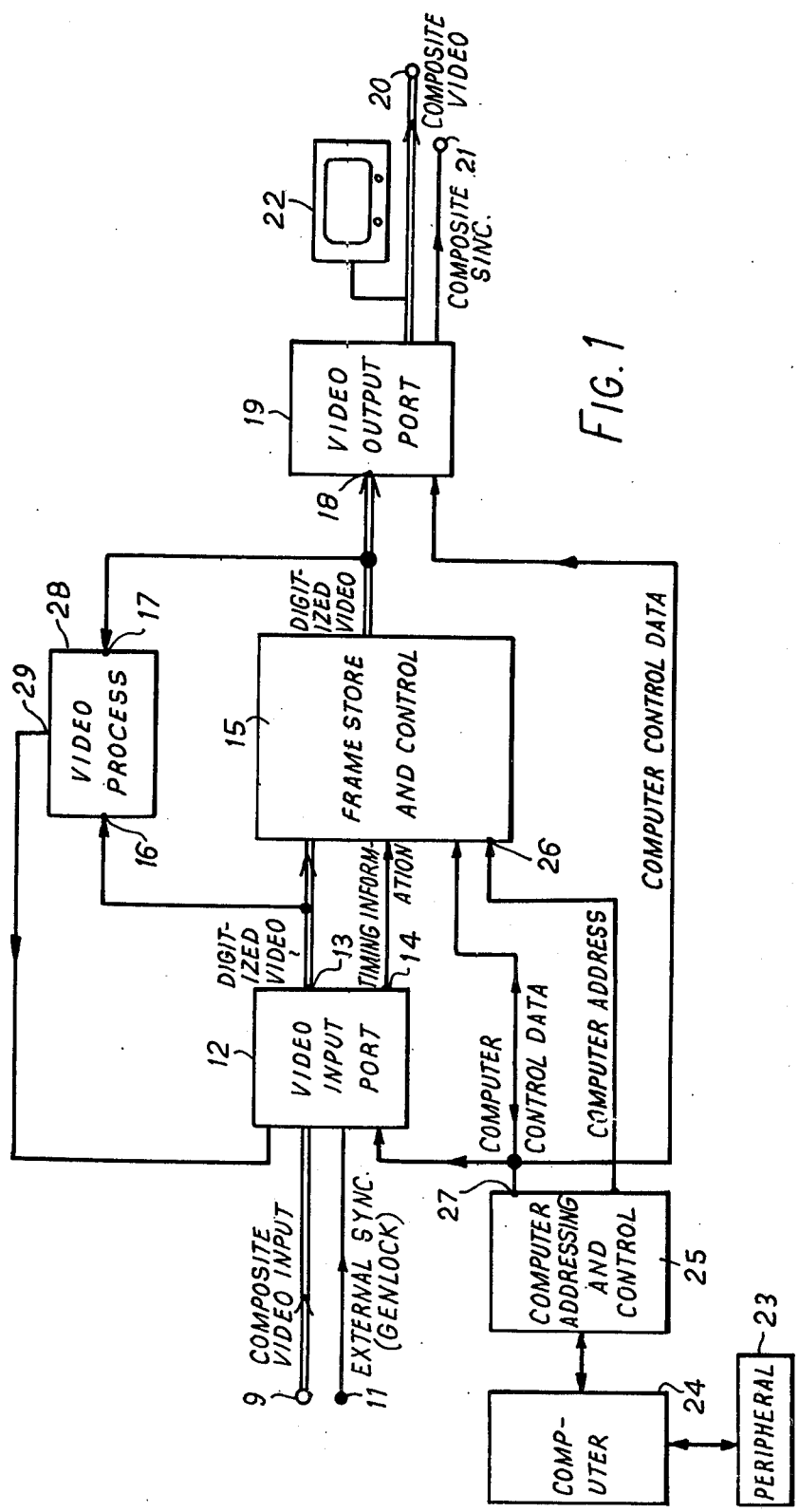
FIG. 1 shows a block schematic diagram of the system of the present invention.

In the video processing system of FIG. 1, a composite video signal is received at input 9 and applied to video input port 12 which separates the sync pulses present on the incoming video. The incoming video is converted from analogue to an 8 bit digital word within input port 12 and the digitized output 13 is applied to a frame store and control 15. The detected sync pulses on the incoming signal are used within port 12 to provide timing information for clocking the analogue to digital converter and timing information is also provided at output 14 for the frame store and control 15. External syncs (genlock) may be provided at input 11 to provide the necessary timing information if required.

The digitized video samples (picture points) are stored in a large number of memory locations within the frame store and the addresses of these locations are accessed by the store control in time relation to the timing information from the output of video input port 14.

The digital video held in the frame store is read continuously to the input 18 of a video output port 19 which converts the digitized video data to analogue form and adds sync pulses from an internal generator to provide a composite video signal at output 20.

The sync pulses generated also provide timing control for addressing the store locations to read out the stored data. External syncs (read genlock) may be applied to port 19 if required. The composite video can be displayed on a conventional T.V. monitor 22.

The basic conversion, storage and reconversion of the video signals can be modified by means of a computer 24 and computer address and control unit 25. The output 27 of control unit 25 is received by input port 12. Control unit 25 under computer control can adjust the number of bits in a word to be used (i.e. up to 8 bits) and also decide whether the entire frame is stored. The computer 24 has access via control 25 control data line 27 to the store 15. Computer address information from control 25 is received by input 26 of the store.

The computer therefore is capable of addressing any part of the store, can read out the data and modify the data and re-insert it via video input port 12.

The computer control data line 27 is also connected to output port 19 which control can select for example the field to be displayed, the number of bits to be used and the positioning of cross wires (explained below). Any required computer peripheral 23 can be attached to the I/O buses of the computer 24.

Instead of using the computer to modify the data a video processor 28 is provided which contains processing hardware. The processor 28 receives the digitized video from port 12 at input 16 and the digitized video from the store at input 17. After processing, the data from output 29 can be applied to the video input port 12.

The above system is concerned therefore with storing video data in a digital form in a frame store which data is basically Raster in format. This data may be processed under software control or completely new data may be added. Instructions for the addition and processing of data come from the system computer via control 25. The asynchronous nature of the system allows operation over a very wide range of frame rates from standard T.V. through slow scan systems such as electron microscopes to line scan cameras such as IRLS (infra red line scan) and SLAR (sideways looking airborne radar). Non-raster type formats such as spiral and polar scans could be entered via the computer interface. The operation of the above system requires timing information which is extracted from the sync information (write genlock), contained in the composite video input. The video information is digitized by converting each picture point to an 8 bit word to give 256 possible levels (e.g. 256 shades of grey). The digitized data is written into locations, specified by an address, within the frame store. The timing information extracted from the sync information is used to define the address. This timing information gives positional information (start of line, end of field etc.) to enable each picture point to be written into the frame store in its correct position.

The frame store used in this embodiment is that disclosed in co-pending British Patent Application 6585/76 (U.S. Application Ser. No. 764,148) which comprises 16 cards each made up of N channel dynamic MOS R.A.M. integrated circuits. The store structure is related to that of the T.V. raster and may be considered as two cubes. Each cube holds one of the two fields that make up a frame. Each field consists of 256 lines, each line containing 512 picture points. Each picture point is stored as an 8 bit word to the store has 8 bit planes. Alternate lines of the frame are stored in alternate fields. The two halves of the frame store may be used independently to store two separate frames, the resolution of which will be half the normal. Depending upon the resolution required each field may also store separate pictures (up to 8 separate 1 bit resolution pictures). The frame store can accept video at 10 MHz (15 MHz max.) sampling frequency and reproduce it for display at the same rate.

The reading process from the store to the display is uninterrupted by any computer demands. For the purpose of reading from or writing into the store the access time of the memory is 67 nSec therefore enabling a standard T.V. picture to be easily accommodated from the 512 samples in a line. The computer can only gain access to the frame store during the line blanking period. The computer has random access and specifies its address in an array form.

Figure 2:
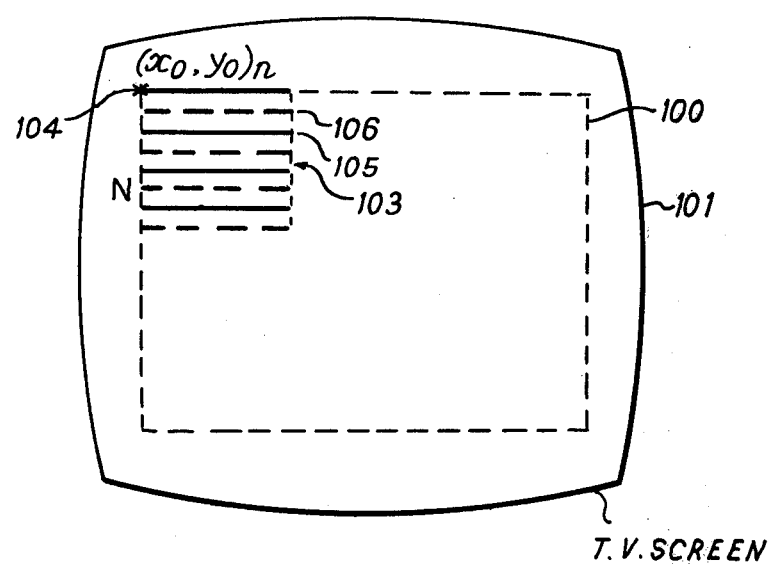
FIG. 2 shows the accessing of an array by computer from the stored frame.

The principle of array addressing is illustrated in FIG. 2. A frame of video data 100 is shown on T.V. screen 101. This will be the information captured and stored in the frame store. The rectangle 103 is the picture area to be addressed by the computer and comprises n picture points horizontally and N picture points vertically. Lines 105 are for odd fields and 106 for even fields. Picture point 104 can be considered point $x_o$, $y_o$, this giving the array position. The picture points in the array are accessed in turn i.e. $(x_o, y_o)$ to $(x_o+n, y_o)$ then $(x_o, Y_o+1)$ to $(x_o+n, y_o+1)$ and so on until $(x_o, y_o+N)$ to $(x_o+n, y_o+N)$. The selected array may however be of any size from single point to the whole store. The array selected may also be in any position within the store. Thus by merely identifying the top left hand corner of the rectangle and the length of the two sides any address area is accessible. Computer data is fed in at a slow rate (typical cycling frequency of the computer is from 500 KHz depending upon whether an array is being addressed or individual picture points) and is buffered to be fed into the frame store at the transfer rate of the system, typically 10 MHz. Thus data is speeded up for writing out into the store and slowed down to read it back to the computer.

The store has the facility of being 'bit selectable'. This means that any part of the 8 bit word may be written into or read from the store. This allows different and unrelated pictures to be held in the respective sections of the 8 bit planes. Alternatively, part of the 8 bit word may be reserved for superimposing the output of the computer onto the original picture stored at say 6 bit level. The result picture can be monitored on the display.

The data transfer from the frame store to the output side of the system is performed by timing signals generated from an external sync (read genlock) source for example. This external sync source (read genlock) can be the same as the write genlock which will produce a synchronous operation. Normally read genlock is produced separately to lock the output video in step with any other source of video it is to be mixed with to produce a final picture (e.g. to produce captioning). This is the asynchronous mode of operation with the read and write sequences running independently of each other to allow transfer to and from the store to effect simultaneously at two differing store addresses.

The two fields can be interlaced in two ways to provide a full frame picture on the display. Firstly the normal method of interlacing i.e. reading each field alternatively, or secondly using a special 2:1 interlace. This second method allows for the odd lines to be repeated in the even display lines or vice versa. Using this second method allows a second and unrelated frame to be stored in the other field. By interpolation it is possible to substitute information from adjacent picture points for example to remove the effect of a faulty store element should this arise.

Figure 3A:
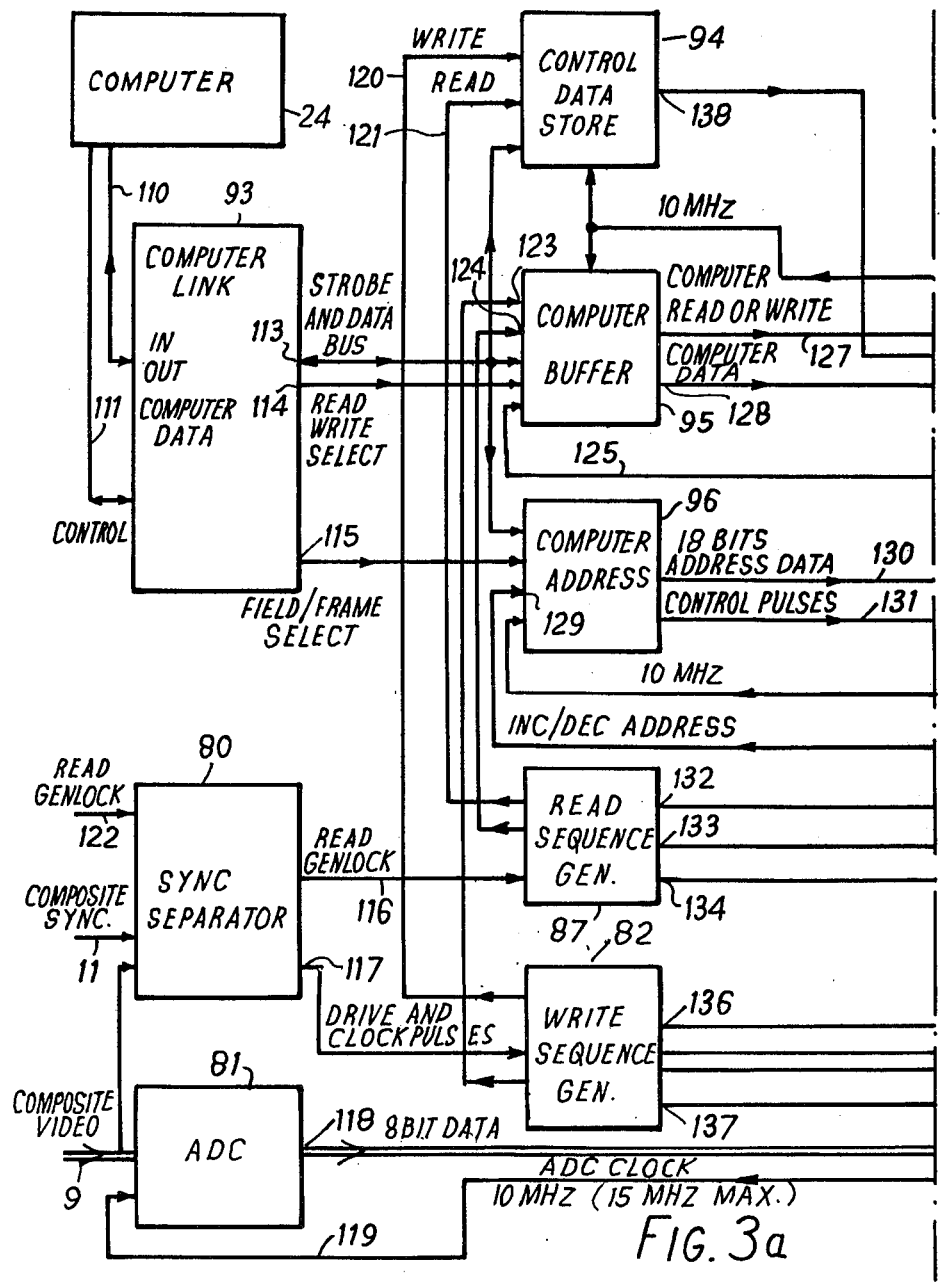
FIG. 3a and 3b shows in greater detail the constituent elements of the system of FIG. 1.
Figure 3B:
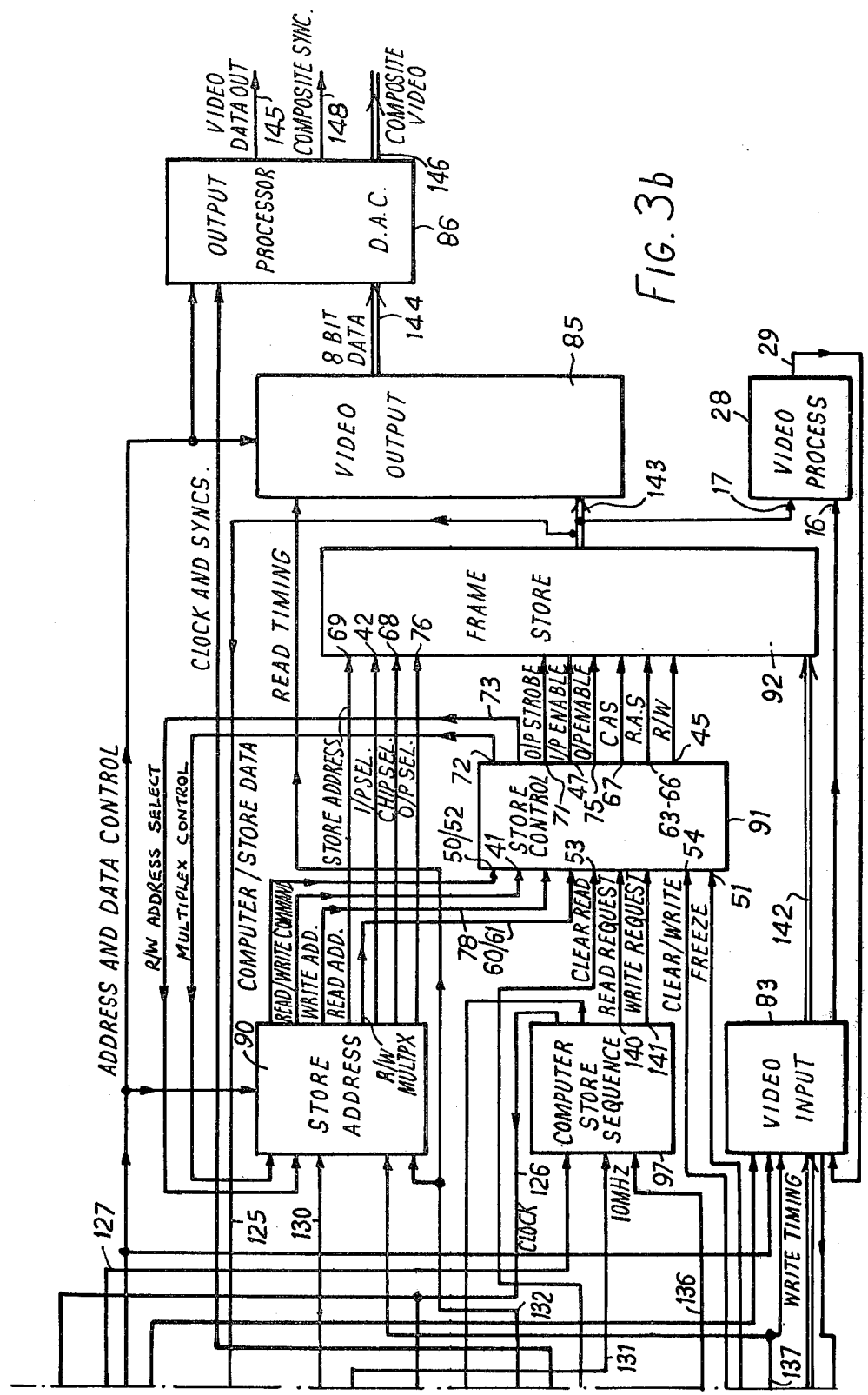

The constituent elements of FIG. 1 are shown in detail in the embodiment of FIG. 3. Broadly the video input port is formed from ADC 81, write sequence generator 82 and video input unit 83, and the lower part of sync generator block 80.

The video output port is formed from video output unit 85, output processor 86, read sequence generator 87, and the upper part of the sync generator block 80. The frame store and control is made up of store address 90, store control 91 and frame store 92.

The computer addressing circuit control is provided by computer link 93, computer buffer 95, computer address 96, computer store sequencer 97 and control data store 94.

Hardware processing block 28 is as shown in FIG. 1.

The composite video signal containing sync and video information is fed to input 9 of the ADC 81 and to the lower part of sync separator 80. The sync separator separates the sync information from the video information. The sync pulse is used within the separator to provide timing information which gives the start of line, field and end of frame for example. This timing information is received by input 117 of write sequence generator 82.

Sync separators used to provide such timing information are well known in the art especially relating to time base correctors and are therefore not described further.

The extracted timing information is used to ensure that any picture point can be related to any other in time, i.e. what field and line it is in and how far along the line the picture point is. This ensures that the picture points are stored at the correct location in the frame store. The write sequence generator 82 provides write clock pulses at output 137 which are received by video input block 83 and store address block 90. Write sequence generators are well known from time base correctors and basically comprise an oscillator and a number of counters providing a number of clock pulses.

The ADC converts each picture point on the incoming video into an 8 bit word. This gives 256 possible levels (e.g. 256 shades of grey). Clocking of the ADC at 10 MHz is provided on line 119 via video input block 83. The ADC output 118 is fed to the video input block. (This 8 bit output may be at balanced E.C.L. (emitter coupled logic) level. A.D.C.'s are well known from time base correctors. The video input block may process this data prior to feeding it out on lines 142 to the frame store. The video input block 83 also feeds data to and receives data from a video processor 28 on lines 16 and 29 respectively, if required to allow any required external hardware processing to be carried out. The computer also communicates with the video input block 83 via the computer buffer 95 and control data store 94. During the line blanking period any computer data that is to be written into the store is sent from the computer buffer on line 128. Processing information is sent in the form of control address, control data, from the control data store on line 138 and this details the type of processing to be carried out. The video input block inputs to the store on line 142 either digitized video data (converted from E.C.L. to T.T.L.) or computer data, under control of the write sequence generator 82. The video input block 83 includes latches for holding the 8 bits received and allowing these to pass to the store. Alternatively the input on line 118 can be by-passed to input 16 of processor 28. Also output 29 can be passed to output 142.

The reading of data from the frame store 92 along line 143 to the video output block 85 and along line 144 from the video output block to output processor 86, is under the control of the read sequence generator 87. The output blocks 85, 86 reconstitute the signal to a composite video signal.

The generator 87 provides timing information for the video output block 85 from output 132 and a clock and sync pulse train for the output processor 86 from output 133. The read sequence generator 87 provides timing information similar to the write sequence generator (i.e. start of line etc.). The generator 87 is controlled by a read genlock signal on line 116 received from line 122 via sync separator 80. The data read out from the store is latched out to the video output 85 where any processing that is required is completed. The processing in video output block 85 includes overlay, cursor, bit shift, invertion or window select. Stores and counters within block 85 provide the required control in dependence or instructions received from data store 94. (The data format can also be changed from TTL levels back to ECL levels such that the output is given on 16 balanced lines to the output processor). The output processor 86 contains a digital to analogue convertor (DAC) which is clocked by the read sequence generator output 134. The reconstituted video signal is then mixed with the sync pulse train from output 134 to provide a composite video output for display at output 146. The sync pulse train is also fed out to provide synchronisation for any external hardware that may require it at output 148. The non-composite video data may be taken from output 145. Digital to analogue conversion and the provision of composite video is well known from time base correction and is not described further. The purpose of the store address card 90 is to produce addresses which specify the location in the store 92 that is needed for access. The read and write sequence generators provide clocking pulses for the store address card on lines 132 and 137 respectively to give such information as, when to start addressing the store, what rate to address it at, when to stop at the end of a line and how many lines are to be addressed. Computer data is also transmitted from the computer address block 96 along line 130.

The store address block 90 generates three kinds of addresses:

(i) from information received from the write sequence generator the address into which the input data is to be put is specified.

(ii) the clocking pulses from the read sequence generator specify which location(s) of the store have to be read from. (This also ensures that the rate at which data is read from the store is the same as that of the sync train generated by the read sequence generator.

(iii) addresses from the computer address block which generates addresses for the computer data.

The store address block 90 produces the required store addresses as two 6 bit addresses multiplexed in two halves to inputs 69 of frame store 92. The store address block 90 also carries out a refresh operation during non reading intervals. This is because the frame store RAM's are dynamic and if the RAM is not read within a 2m second period the information is "forgotten". During the field interval the store address block carries out a "during" read cycle, on the frame store to keep it busy and preserve the already written data, (the data called up during the dummy read cycle is not required and is lost). The store address block 90 sends addressing signals to the store control 91 to enable it to produce timing pulses for the store elements. These addressing signals to the store control are provided as read/write command at inputs 50/52, write address at inputs 41, read address at inputs 78 and row address strobe multiplex for read/write at inputs 60/61. Store address block 90 also provides I/P select at input 42, output select at input 76 and chip selects at inputs 68 of store 92. The timing pulses from the store control card are provided to ensure that the memory is not asked to both read and write at the same time.

The control 91 employs a queing system such that if the store is reading and write request is generated it is ignored and vice versa. It therefore differentiates between read and write requests and prevents them interacting. Signals from the computer store sequencer 97 are also received as a read request from output 140 of sequencer 97 and as a write request from output 141 and state when the computer requires to carry out a read or write operation. Store address block basically comprises three sets of counters for write, read and refresh respectively.

The construction of the frame store 91 and control 92 is disclosed in detail in co-penidng British Patent Application 6585/76 (U.S. application Ser. No. 764,188), and FIG. 5 thereof is shown herein as FIG. 4 from which it is seen how the various signals from the store address block 90 and computer store sequencer 97 are processed. The read/write address select signal from output 73 of the store control 91 is received by the store address block 90 and the multiplex control output 72 for the multiplexing in two halves of the address is also received by the store address block 90. Clear write timing at input 54 of control 91 is received from write sequence generator 82 and clear read signals at input 53 from read sequence generator 87.

FIG. 4 shows the store control together with one of the 16 store cards. The store card 30 includes block 32 of 4 rows of RAM chips 10, each row comprising 8 chips (one for each of the 8 data bits). Thus, the total number of storage chips is 32. The card 30 includes input latches 31 and output latches 33. The card also includes a valid data detector 34 described in more detail below. It is to be remembered that 15 other similar cards 30 (not shown) complete the store. Thus, an input multiplexer 35 has 16 outputs 47 for the 16 cards. One output is shown connected to the latch 31. Similarly, an output multiplexer 39 is shown with one output 75 connected to output latch 33. Although the remaining outputs of the input and output multiplexers are shown without connections, these in fact are connected to the other 15 cards. A row address strobe multiplexer 36 and timing control 38 provided have outputs commonly shared by the other 15 cards. A queueing logic circuit 37 (described below) is connected to the timing control 38.

Now since the input data for the cards comes via a common highway, this data must be latched into each card in turn by individual clocks so that after 16 clock periods, all 16 cards hold one word of data.

These first words are held in the first position in latches 31. Latches 31 may be provided by known register file chips (e.g. 2 × 74LS170 which is a 4 bit 4 location register, only 2 locations being used). The information is clocked into these files by the input enable signal, at video frequency received from input multiplexer output 47 and the address is set by input select signal received at input 42. Now when the first 16 words have been passed to the cards, the next 16 words appear in sequence on the highway and are again latched into the cards, except this time input select is changed so that these latest words are entered into the next position in the register file 31.

It will be clear that input select is, therefore, changing at 1/16 the original video frequency (as there are 16 cards). The output of the register files is controlled by the inverse of input select, this is all that is necessary to present the contents of the known registers on their output terminals. Now since input select is operating at 1/16 the video frequency, it will be obvious that the data presented on the outputs of the register files will be held constant for approximately 16 times the data period present on the original input highway.

Since the 4096 bit RAM chip is relatively slow in its operation, this internal demultiplexing is necessary to reduce the speed requirement for any individual chip. However, the external addressing system is still that of a conventional array. (The 9 bit binary address defines the line in the picture and another 9 bit address defines the picture point within the line as explained above.)

It will be clear that this demultiplexing, or apparently slowing down the input data has been achieved, and the input data is present on the input terminal of the 4K RAM for more than sufficient time for the RAM to absorb the information.

Now the addressing for the RAM has already been described and enters as just 6 address lines at input 69 which carry the 12 bit address multiplexed in two halves (i.e. chip row address followed by chip column address). The individual device is selected by having 4 separate row address strobes RAS 1, 2, 3 and 4 on lines 63, 64, 65 and 66 respectively from row address strobe multiplexer 36 which receives row address strobes (RAS) from timer 38 at input 62, only one operating for each store cycle. These, of course, operate in turn, so the sequence of events for an address structure is the first 4 bits of the address entering at inputs 41 representing 16 cards are decoded to produce the input enables from input multiplexer 35, the next two bits of address entering at inputs 60, 61 are decoded in the row address strobe multiplexer 36 to produce the 4 row address strobes RAS 1, 2, 3 and 4. The final 12 bits are the main device address multiplexed in two halves to input 69. Column address strobe (CAS) is provided on line 67 from timer 38.

The output structure for the card is very similar to the input structure except of course it operates in reverse. Essentially, data is transferred in parallel from all 16 cards into their respective registers or latches 33. (The output latches 33 may be provided by four 4 bit latches type 74173 to give the required 8 bits × 2 locations.) This transfer to the latches is effected by 'output strobe' and 'output select' operate at 1/16 video frequency. The registers not occupied with the parallel transfer from the RAM are available for outputting their data onto the main highway by means of 'output enable' received from output 75 of output multiplexer 39 receiving a 4 bit read address at inputs 78; the appropriate device being chosen by the inverse of 'output select'. 'Output enable' operates serially (at video frequency) whereas 'output strobe' operates for all 16 cards in parallel.

The 8 chip select lines 68 enable any part of the digital word in store to be disabled and protected from the writing process if required. Thus, a different picture can be written in bits, say 1 to 4 than that held in bits 5 to 8.

The read/Write lines and row address strobes (RAS) for the store card is not as straightforward as might have first been imagined. The complication is caused by what happens if one card in the group of 16 wants to be written into without any other cards being affected. This is simply achieved for input latches 31 by operating only the input enable corresponding to the card in question. However, when the data is transferred across in parallel, the store locations in 15 of the 16 cards would be receiving false information.

To prevent this receipt of false information the valid data detector 34 is provided which receives input selects and input enables at inputs 43 and 44 respectively together with read/write signals at input 46 from timer 38. If an input enable is detected for this card from input multiplexer 35, the detector 34 allows the data entered into the latch 21 to be subsequently transferred to the store under control of read/write from output 45. If an input enable for that particular card is not received from input multiplexer 35, then the detector will now allow the store cycle to proceed.

Queueing logic block 37 also receives read/write signals on line 56 from timer 38. Write commands are received at input 50 of queueing circuit 37 and read commands at input 52. Freeze input 51 to block 37 holds the data in the store. Write commands are received by timing circuit 38 from output 57 and read commands are provided from output 55 which are arranged to be temporarily held in block 37 if the store is busy with another part of its cycle which is detected from the read/write signals at input 56. Clear read and clear write facilities are provided at inputs 53 and 54 respectively. Additional timing signals are provided from timer 38 which are read/write address select at output 73 and multiplex address control at output 72 for use with the RAMs in known manner as above.

It is to be remembered that the store 91 comprises 16 cards of the type shown as block 30 in FIG. 4 to give 512 lines of video storage.

The control and distribution of computer information is performed by the computer interfacing blocks, i.e. computer link 93, computer address 96, computer store sequencer 97, computer buffer 95 and a control data store 94.

All information fed to and from the computer is transmitted along balanced lines 110, which may be at ECL levels for noise immunity. Control is provided on lines 111. The information is sent on 16 balanced lines and is accompanied by strobe and sense pulses which state what information is being sent.

The purpose of the computer 93 is the conversion of the computer information. When information is to be written into the store from the computer it converts input from ECL to TTL level (to give compatibility with the rest of the system). When information is to be read from the store to the computer it converts back to ECL levels. The computer link card also performs some control logic to control the operation of the computer. It contains field frame information, i.e. is the computer going to address one or both fields, and which read/write cycle is to be initiated. This is provided on output 115 to computer address block 96. The computer information is fed out from the computer link card along a computer data bus 113, with associated strobe and control pulses to control data store 94, buffer 95 and computer address block 96. The computer address block 96 receives address information along this bus together with a strobe address pulse. The strobe pulse indicates that the information on the bus is address information for this block and gives the size and position of the array. The address block 96 also counts picture points, this allows the computer to know when enough data has been received or transmitted by it to cover the specified area of the array. Control pulses from line 131 of the computer address block 96 includes the information for number of picture points count for sequencer 97. The computer store sequencer 97 carries out the necessary timing for the writing and reading of information to and from the frame store via the store address 90. This is required because this data is not in a raster form and can therefore only be written into or read from the store during the line blanking period. Computer store sequencer comprises two sequence generators one locked to the write sequence generator and one locked to read sequence generator. During reading or writing the address in computer address 96 is incremented and the word count decremented by signal on line 129. The picture information (data) is routed along the bus 113 with its associated strobe pulse (strobe data) and also bus control to the computer buffer 95. The bus control pulse disables the computer data output drivers during active frame time or when the computer is transferring data to the computer address block or the control data store. The computer buffer 95 acts as a temporary storage device for the data until the line blanking period occurs. The buffer 95 receives a signal from sequencer 82 at input 123 that the computer may write and that the computer may read at input 124 (from sequencer 87). 10 MHz clocking output 126 of sequencer 97 is taken from output 136 of write generator 82 for example.

Input update for control data store 94 is provided when a write frame clock is received at input 120 from sequence generator 82. Output update is provided when a read frame rate clock is received at input 121 from sequence generator 87.

Data store 94 generally comprises a random access memory of 64 words/9 bits (e.g. chip type 82SO9) together with associated counter chips.

Data store 94, bus 138 is connected to store address block 90, video input block 83 and output processor 86. The output 126 of sequencer 97 provides a 10 MHz clock for computer address block 96, buffer 95 and data store 94.

The read or write control output 127 from buffer 95 is received by sequencer 97. The computer data from buffer 95 at output 128 is connected to an input of video input block 83. Read/write select input to buffer 95 is under control of the computer from output 114 of link 93 which determine whether data associated with the address in block 96 is to be put into the store (write) or taken out (read) from store 90. Data read out from the frame store is received at input 125 of buffer 95.

The line blanking period is about 8 μsecs although the computer cycles at approximately 500 KHz. Therefore there is not enough time during line blanking to insert the computer data. A first in first out store (F.I.F.O.) is therefore provided within buffer 95. This accepts data at the computer rate and then during line blanking puts the data in a rate of 10 MHz. It is also capable of accepting data from the store at a rate of 10 MHz and slowing it down for the computer to acquire in its own time.

The control data store 94 receives computer information in the form of control words (functions) with an associated control strobe on bus 113. The control information relates to any processing that has to be carried out on the digitized video signal. The information for input and output processing is fed out at different times according to the read/write timing relationship. The computer link comprises a number of line receivers and drivers, e.g. type 74367. 16 lines of output bus 113 and used for control functions.

The first in first out function of buffer 95 is shown in detail in FIG. 5. Considering first the write cycle, data is to be passed from the computer to the frame store. An input multiplexer 150 (e.g. 4 elements type 74153) unpacks the 16 bit word from the computer at input 166 to 2×8 bits either top 8 bits first or bottom eight bits first. The output of input multiplexer 150 is fed to a memory 151 of 256×8 bits (e.g. 8 type 74S201) using write address from write address counter 153 (e.g. type 74161) via multiplexer 154 (e.g. type 74S157). The write address counter 153 at input 167 and an up/down counter 155 (e.g. type 74S169) at input 168 are both incremented. Data is read out of the memory 151 directly at output 173 under the action of a read address counter 157 (e.g. type 74161). Read address counter 157 is incremented on line 169 and contents counter 155 is decremented on line 170. When contents counter 155 detects that the memory is full then no further writing is allowed. Conversely when contents counter says memory is empty you cannot read. The control logic block 159 receives input requests at input 160. These come as strobe pulses with data from the computer. The output requests at input 162 come from the computer store sequencer.

In the read mode, data from the frame store is in 8 bit word form and passes through the memory 151 as before and the output is packed up into 16 bit form to be sent to the computer by latches 165 (e.g. 74S175). The input request for this cycle comes from the computer store sequencer and the output request comes as a strobe pulse from the computer.

Read/write control for multiplexer 154 is received on line 172. The bidirectional F.I.F.O. memory of the buffer is similarly used in the computer address block 96 to provide array dimension storage for the computer. Counters are provided for the address and number of picture points in the array, the counters providing up counts for horizontal and vertical address and down counts for horizontal and vertical dimensions.

The computer 24 may be for example a Computer Automation Alpha L51-2 mini-computer. This family of mini computers is highly flexible and easy to programme using assembler language. Organisation of the CPU enables the computer to obtain a high memory efficiency, the I/O structure is simple making interfacing easy. Other mini computers could be used. Transfer of data is via link 93. The standard I/O bus transfer is concerned with setting up picture areas and the truly random address mode operation. Further the I/O section passes data for control of various other modes of the machine including bit select, type of interface, acceptance of a new frame of video and which field is to be used. Peripherals can be added if required. These include tape decks, line printers, graph plotters, touch tablets, VDU's and teletypes. A large computer can be interfaced to the system via the mini computer.

The control functions for the system are provided as a 16 bit word which is used to define the type of processing to be carried out and to what limits it will be operated in. Each different process may be made up of one or more of these 16 bit control words. When considering these control functions the system should be regarded in three parts
(i) input side
(ii) output side and
(iii) computer interface The input and output sides can be set into different modes to perform different operations on the digitized video data. These control functions are fed from the computer via the bus 113 to the control data store and stores them until requested to feed them out the relevant blocks. A restriction is placed on the control data store by the inputs 120, 121 so that the control parameters (information) to both the input and output sides can only be changed between frames. The control data store is therefore capable of storing the control function parameters for a complete frame. For processing on the input side the write sequence generator 82 generates a write frame rate clock once per frame which is routed to the control data store input 120 as a request (input update) to transmit any control functions relevant to processing the input video data. In response to this input update request the control data strobe outputs the number of control functions according to how much processing is to be carried out. The control function is transmitted as a 16 bit word to which is added an address and a strobe pulse. The control function address and strobe pulse are all routed along the control data highway 138 to the store address 90 and video input block 83. The strobe pulse and address are decoded by the blocks to decide which card is being addressed and that card then takes the control data off of the highway. The decoded address also initiates the appropriate circuit on the card for the processing, the control data gives the instructions of how the processing is to be carried out.

The processing of the output data on the output side of the system is very similar to that described for the input side. The putting of control data onto the highway is caused by an output update request which originates from a read frame rate clock pulse at input 121 generated by the read sequence generator. The output control functions are fed to the video output 85 and the store address blocks 90 (the store address has a split function because it is used for both input and output functions).

Although 525 line format system is described it would also be possible to extend this to 625 lines. Controlling of the computer interface is not restrained by having to look at frames and functions are actioned immediately. The computer knows by virtue of the two-way flow of information to and from it when it can alter the computer function. The functions are directly decoded by the computer link card from the information transmitted by the computer.

As explained above the control function (word) is a 16 bit word. The word may be regarded in three parts:
(i) device address
(ii) function code
(iii) data The device address of the word indicates whether the word is for use as an input, output, interface or feedback function. The function code part of the word instructs the selected block (video input, video output or store address) as to which process is to be carried out. The 8 bit data part of the word gives the actual instructions as to how and to what limitations the processing is to be carried out.

Examples of specific output control functions are listed below.

(a) Cursor or Crosswires

The cursor consists of a horizontal line two lines wide, a vertical line two picture points wide, and the point of reference is the intersection of the cross. The cursor is used to point to a position in store and the control is implemented by the video output block 85. This is achieved by two control words. One defines how far from the left hand edge of the screen the point is (vertical cursor) and the second how many lines down the screen (horizontal cursor) it is.

When the video output card receives the word it counts picture points across the line and counts down the line. When there is a match between the counters and the data contained within the word it outputs the cursor horizontally and vertically. The cursor output can either be black or white which is controlled by the overlay function below.

(b) Overlay

The function of overlay is also carried out by the video output card. The card is instructed to look at the output of a specified bit-plane which is the overlay code. If the specified bit output is a logic '0' it ignores the rest of the instruction. If it is a logic '1' the other 7 bits to the DAC will either be forced to all logic '0's (black) or all logic '1's (peak white). Another bit of the logic word determines the colour and it is this colour that the cursor will be forced to.

(c) Output window

The operator can select only a limited area or window of the data to be outputed.

The output window is a function defined by 6 words and processed in the video output card. The output window is a rectangular area that has the effect of either putting a patch on the screen or a border around the viewing area. The first four words of this output function define the position of the top left hand corner of the window (this requires horizontal and vertical components) and the lengths of the horizontal and vertical sides of the rectangle.

(d) Bit Shifting

All the data needed to carry out this instruction is sent over as one word to the video output card.

The frame store outputs a specified 8 bits to the digital to analogue converter (DAC), the purpose of this function is to determine which bit of this data is to be fed to the M.S.B (most significant bit) of the DAC. The word also defines how many output bits after the function selected bit are going to be fed to the DAC, any bits that are not used are forced to zero volts. Using this function it is possible to store from 2 (4 bit resolution) to 8 (1 bit resolution) pictures that are totally unrelated at any one time.

(e) Video inversion

Processed from a single word input to the video output card. The video output card receives output data from the frame store and merely changes the logical '0's for logic '1's and vice-versa. This causes blacks to be displayed as whites and whites as blacks which is particularly useful for infra-red application.

(f) Field select

This is carried out by the store address card from a single control word. The word instructs the video address card whether to read out just one field (if so specify which one), both or neither to make up the picture. If for example field 1 is selected by the word the frame would consist purely of field 1 data (i.e. field 1 is repeated twice). Having two consecutive lines displaying the same picture halves the vertical resolution. The word actually forces the M.S.B. of the read address to 1 state depending on which field the computer instructs to be read out. When both fields are selected (i.e. normal mode) the M.S.B. is allowed to toggle normally between the two states.

(g) Scrolling

The operator can shift the origin of the picture being displayed by any number of picture points. The scrolling function requires two control words from the control data store. One contains the parameters for the horizontal component and the other parameters for the vertical component and are decoded by the store address card from line 138.

The vertical component is coarsened by dividing it by two ignoring L.S.B (least significant bit) of vertical word. This is because if scrolling is carried out by an odd number of lines it has the effect of sending field 2 out before field 1. When this effect is viewed on a moving picture it appears as if the picture is going 2 paces forward and 1 pace back. By halving the vertical component it is impossible to select an odd line.

The two parameters are received by the address card, which uses them as the start of the address. Normally the addresses start at 00 (i.e. top left hand corner see FIG. 2).

The defined picture area for scrolling is moved up to the top left hand side and the remainder of the picture outside this area is just placed around it. The output scroll function does not affect the cursor position on the displayed picture.

Input functions

Input control functions similar to the output functions can be effected as follows:

(a) Input window

Control effected in video input card 83.

(b) Field select

Carried out on the video input card.

If freezing of the picture is required then the word selects neither field and physically prevents data being entered into the store. When preventing the store from changing its data the read address provides a refresh cycle during every frame interval.

(c) Bit shifting

Carried out on video input card. The action of input bit shifting is to take the M.S.B. of the ADC and shift it down, by the number of places specified in the control word, the store location.

The bits of the store not used are written as zero and the unused bits from the ADC are lost. This gives an effective alteration to the output resolution. If the ADC output is shifted by four places, this gives a 4 bit resolution picture and would allow the store to be used to store two completely independent 4 bit pictures.

The bit shift function is normally coupled with that of an ADC protect function.

(d) ADC protect

The parameter for this word is fed along the control data highway as one word to the store address card 90. The data contained in the word controls which bit position in the store is written into.

This is done by effectively putting the chip select signals fed to the selected M.O.S. Rams of the frame store to the disabled store during a write cycle.

The various input control functions as explained above are effected by the video input card 83 which contains latches (e.g. type 74L5175) which receive the data from the ADC and pass this data via multiplexers (e.g. type 74LS153) to further latches which hold the 8 bits of data and output the data via further multiplexers to the frame store. The incoming data from control data store 94 is held by various stores in the video input card, e.g. shift code store, window store, window address store etc. The stores simply comprise a series of data latches (e.g. 74LS170 or 74LS175). The incoming computer address control data is decoded in a decoder and passed to the various stores. Associated line counters and picture point counters (e.g. 74LS191/74S163) are also provided.

The various output control functions as explained above are effected in the video output card 85. This card is similar to the video input card 83 as it contains latches (which receive the data from the frame store) and bit shift, window and window address stores (i.e. latches) for the control data together with window counters and address decoder. In addition a cross wire address store and cross wire counters are provided. A video invert store and overlay store are also included.

Computer Interface Functions

The computer interface functions operate on a similar basis to the input and output control functions. They control the interface by governing which way data will flow along the bi-directional data lines. The software also determine which internally generated signals are to be used as interrupt signals which are used by the computer as timing reference. The interface word is a 16 bit word similar to the control words, i.e. 9 bits of data, 5 bits of address and 1 bit control. The control bit is decoded by the computer link card and determines which interrupt is to be selected, i.e. interrupt 1 or interrupt 2. There are three interface functions:

(i) interrupt (1 and 2) to provide timing signals during processing, (ii) field/frame mode to select address of the store as a whole or in two halves.

(iii) read/write controls the direction of flow along the bi-directional data lines.

Multiple Inputs

By providing multiple input ports asynchronous video sources can share the one common synchronous display.

Partial Colour

The standard 8 bit system can be adapted to produce RGB colour by allocating some of the 8 bits in the video word to chrominance. For example the word can be split so that five bits are used for luminance and three for chrominance, this would give the choice of eight colours for each picture point. An additional option allows the computer to change this selection of eight different colours on a frame-by-frame basis. In this way the entire hue triangle is available to the programmer with only an 8 bit system.

Full Colour

The system can be expanded to produce full RGB colour by addition of another two frame stores. Colour pictures may be either entered into the system on a frame sequential basis or alternatively three input video ports can be provided. All the facilities of the monochrome system can be extended to the colour version.

Thus the system provides an intelligent television system for electronic generation and processing of pictures giving the operator interaction with the machine since, in real-time, a frame of video can be captured, displayed, and interfaced to a computer. The resolution of the system, both spatial and grey level, is matched to that of conventional television, ensuring no degradation of the picture. The operator is free to process the captured frame in many different ways by merely changing the computer programme whilst observing the results on a flicker-free TV screen, and the possibility of replacing the software with hardware is also provided for.

I claim:

1. A video processing system comprising:
   (a) analogue to digital converter means for receiving a video signal and converting said signal into digital form;
   (b) a digital frame store for receiving and storing the converted video data;
   (c) store addressing means for addressing locations within the frame store to write in and read out data therefrom;
   (d) digital to analogue converter means for receiving data read out from said frame store and for converting the data into analogue form; and
   (e) accessing means for providing random access to the frame store locations during the video blanking time to allow processing of the data with an algorithm so as to modify the data held at the accessed location in the store.

2. A video processing system according to claim 1 wherein the frame store includes control means for controlling the writing in and reading out of data from the store at the locations specified by the store addressing means, and read and write sequence generator means for sequencing of the store addressing means.

3. A video processing system comprising:
   analogue to digital converter means for receiving a video signal and converting said signal into digital form;
   a digital frame store for receiving and storing the converted video data;
   store addressing means for addressing locations within the frame store to write in and read out data therefrom;
   digital to analogue converter means for receiving data read out from said frame store and for converting the data into analogue form;
   accessing means for providing random access to the frame store locations during the video blanking time to allow processing of the data with an algorithm so as to modify the data held at the accessed location in the store;
   control means for controlling the writing in and reading out of data from the store at the locations specified by the store addressing means;
   and read and write sequence generator means for sequencing of the store addressing means, and wherein the accessing means comprises:
   a computer for generating the required address location information;
   computer address means for receiving the address information and for applying the required addresses to the store addressing means;
   computer buffer means for receiving data read from said frame store or data to be written into said frame store;
   and computer sequencing means for providing timing signals for the computer address means and said computer buffer means to ensure that the data contained within the computer buffer means is only read from or written into the store during the line blanking interval.

4. A video processing system according to claim 3 wherein the computer buffer means receives read and write enabling signals from the read and write sequence generator means.

5. A video processing system according to claim 3 wherein the computer buffer means comprises a bi-directional store which receives and transmits data from and to the computer at a first rate compatible with the computer and which receives and transmits data from and to the frame store during the line blanking time at a second rate compatable with the frame store.

6. A video processing system according to claim 3 including a video input processor provided between the analogue to digital converter means and the frame store for controlling the amount of data written into the store from the analogue to digital converter means.

7. A video processing system according to claim 4 including video outputing means provided between the frame store and the digital to analogue converter means for controlling the amount of data converted by the digital to analogue converter means from the frame store data.

8. A video processing system according to claim 7 wherein control data storage means are provided which receives and stores control data from said computer to effect control of the processing of the data through said video input processor and said video outputing means.

9. A video processing system according to claim 8 wherein control data within the control data storage means is transmitted to the video input processor in response to an input update signal provided once a frame by the write sequence generator means, and wherein control data is transmitted to the video outputing means in response to an output update signal provided once a frame by the read sequence generator means.

10. A video processing system according to claim 8 wherein the store addressing means receives control data from the control data storage means to control the addressing of the frame store.

11. A video processing system according to claim 8 wherein the video outputing means receives control data from the control data storage means for modifying the data read out from the frame store.

* * * * *